United States Patent [19]

Piper

[11] Patent Number: 4,601,281
[45] Date of Patent: Jul. 22, 1986

[54] HOT WATER SUPPLY SYSTEM
[75] Inventor: James R. Piper, Villa Parke, Calif.
[73] Assignee: Piper Hydro, Inc., Irvine, Calif.
[21] Appl. No.: 289,403
[22] Filed: Aug. 3, 1981
[51] Int. Cl.[4] .............................................. F24J 2/04
[52] U.S. Cl. .................. 126/437; 236/91 F; 126/420
[58] Field of Search ............... 126/437, 431, 428, 418, 126/420, 435, 421; 236/91 F; 237/8 R, 63

[56] References Cited

U.S. PATENT DOCUMENTS

| | | | |
|---|---|---|---|
| 3,107,052 | 10/1963 | Garrison | 126/428 |
| 3,977,601 | 8/1976 | Bearzi | 236/91 F |
| 4,000,851 | 1/1977 | Heilemann | 126/437 |
| 4,004,573 | 1/1977 | Frieling et al. | 126/435 |
| 4,037,785 | 7/1977 | Madern | 126/435 |
| 4,138,996 | 2/1979 | Cartland | 126/437 |
| 4,139,152 | 2/1979 | Kronberger | 237/63 |
| 4,143,814 | 3/1979 | Hill | 126/428 |
| 4,153,104 | 5/1979 | Ruder | 126/437 |
| 4,246,886 | 1/1981 | Sitzlar | 126/437 |
| 4,256,089 | 3/1981 | Lewis et al. | 126/420 |
| 4,334,521 | 6/1982 | Jacoby | 126/418 |

FOREIGN PATENT DOCUMENTS

| | | | |
|---|---|---|---|
| 2719852 | 11/1978 | Fed. Rep. of Germany | 126/421 |
| 112535 | 9/1979 | Japan | 126/420 |

Primary Examiner—Samuel Scott
Assistant Examiner—Noah Kamen
Attorney, Agent, or Firm—Lyon & Lyon

[57] ABSTRACT

A system for supplying hot water into a dwelling or the like. The system includes a continuous circulating hydraulic loop for distribution to fixtures and heat exchange units. A storage circuit is employed to add heated water as needed to the loop. A water heating circuit supplies solar energy to the storage system for eventual use in the continuous loop. The storage circuit and the water heating circuit are controlled to provide water on an optimum efficiency basis. Feed water is also supplied to the system through the solar panels of the water heating system.

12 Claims, 2 Drawing Figures

HOT WATER SUPPLY SYSTEM

BACKGROUND OF THE INVENTION

This invention relates to a system for supplying hot water such as might be used for potable systems and heating in dwellings.

Great interest has developed recently in the area of conservation of energy and utilization of alternate energy sources. Among the sources recently receiving attention is solar energy. Goethermal energy and waste heat energy are also being investigated. In utilizing such energy sources, attention must be directed to maximizing system efficiency and minimizing the initial investment in order that such systems may be considered economically competitive with more conventional means for space heating and potable water heating.

Systems have been developed which employ conventional solar panels for collecting solar heat. This accumulated solar heat has then been stored to augment conventional water heating or space heating. In such systems, it is common to run the heating fluid through the panels when the panels are hotter than the storage area. The storage area is in turn coupled with, for example, a water heater as the supply source therefor. The water already retained within the water heater is generally kept warm by more conventional energy sources such as gas or electricity.

Systems for maximizing the efficiency of more conventional heating sources have also been developed. One advanced means for improving the overall energy use in a dwelling or other structure has been developed by the present inventor. This system includes a circuit for constantly circulating hot water through a residence, group of residences or other structures. This circulating hot water may be employed as an almost immediate source of hot water to fixtures and through radiators for space heating. Through proper design, energy efficiency can be achieved. This continuous loop hot water system has been the subject of a number of patents and applications, the disclosures of all of which are incorporated herein by reference. A heating system is disclosed in Piper U.S. Pat. No. 3,526,361. Another related heating system is disclosed in Piper U.S. Pat. No. 3,655,127. Further improvements on these systems are also disclosed in Piper U.S. Pat. application Ser. No. 289,401 now U.S. Pat. No. 4,576,333 concurrently herewith. Detailed patents regarding mounting of equipment and the like for such systems include Piper U.S. Pat. No. 3,926,537.

Both the continuous loop hot water system and the type of systems employing solar energy panels or other heat sources which may not be available on a continuous basis have heretofore employed maintenance heating by a conventional water heating mechanism. In the case of conventional water heating for residences, the solar augmented system attempts to provide heated feed water to the water heater. The water heater must then elevate or maintain that heat by repeatedly starting up. This requirement has also been true of the continuous loop type system. Thus, efficiency is lost in the maintenance of the appropriate temperature level of water previously drawn into the system.

Looking in more detail to the actual features of solar energy systems, certain difficulties have been experienced in the operation of such systems. The first difficulty is experienced in the colder climate where such systems may experience the greatest economic utility. In such colder areas, problems with freezing of the water within the solar panels can develop during dark hours. When the water within the panels freezes, it expands to rupture the tubes of the system if some accommodation is not provided. A common method is to drain the panels during periods of extreme cold. This is less than advantageous in a potable water system and it also requires additional pumping capability to recharge the panels.

Another difficulty experienced by such solar systems is thermal cycling of the fluid within the system. During cold periods, the cooling of the panels results in a cooling of the water within the panels. This cooled water becomes comparatively heavier and tends to flow back from the panel thereby drawing warm water up into the panel. The warm water then cools and a continuous current is formed. Cycling thereby cools the entire mass of stored fluid resulting in a loss of heat energy. Even though this flow is sufficient to result in noticeable loss of efficiency, the flow may be small enough that conventional check valve arrangements are not activated by this termal cycling.

Thus, the emerging solar energy industry has been faced with mechanical difficulties in meeting the requirements of the environment and with efficiency difficulties in meeting the economic competition of more conventional systems.

SUMMARY OF THE INVENTION

The present invention is directed to a hot water supply system for residences and other buildings. The system contemplates the employment of a recurring transient heat source such as solar panels. This heat source is employed with a continuous hydraulic loop hot water system. A storage system which retains heat from the recurring transient heat source is included in the continuous hydraulic loop hot water system when either or both of two conditions are present. The first is when heated water is being extracted from the continuous loop. The second is when the storage system contains water which is hotter than the return water in the loop. Thus, the present system aids in both the preheating of makeup water and in the maintenance of the temperature of the water in the loop. In this way, a more conventional heating unit contained within the continuous loop is augmented in each of its functions, initial water heating and temperature maintenance.

The present invention also contemplates in an aspect thereof the protection of the solar panels from freezing. To this end, the feed water inlet is positioned upstream of the solar panels such that the incoming water must pass through the solar panels. This arrangement has been determined to be of substantial advantage in maintaining a flow of water through the panels to prevent freezing. The feed water also is thereby available to flow through the panels if a power loss is experienced.

The location of the feed water inlet upstream of the solar panels is of practical benefit in heating the incoming water as well, even during the cool hours where the panels are warmer than the feed water but colder than the stored water. In this way, marginal heating is automatically accomplished. This is most useful as a substantial amount of water use occurs during the period of time before and after the solar panels no longer contribute to an increase in absolute temperature within the storage system. This advantage has been found to outweigh whatever losses might occur during night usage when the panels may be at a temperature below that of the feed water.

The present system contemplates in another aspect thereof the condition of thermal cycling. Positive pressure check valves are employed requiring a differential pressure across the check valve for intended operation. In this way, the check valve is assured of being closed to prevent thermal cycling when the solar panels are colder than the stored water.

Finally, the most advantageous use is made of the storage system. Storage tanks frequently experience differential temperatures between the top and bottom thereof of many degrees. By properly introducing and extracting water from various levels of the storage system, maximum use is obtained from the hottest water in the system.

Accordingly, it is an object of the present invention to provide an improved hot water supply system having a recurring transient heat source. Other and further objects and advantages will appear hereinafter.

DETAILED DESCRIPTION OF THE PREFERRED EMBODIMENT

Figure 1:
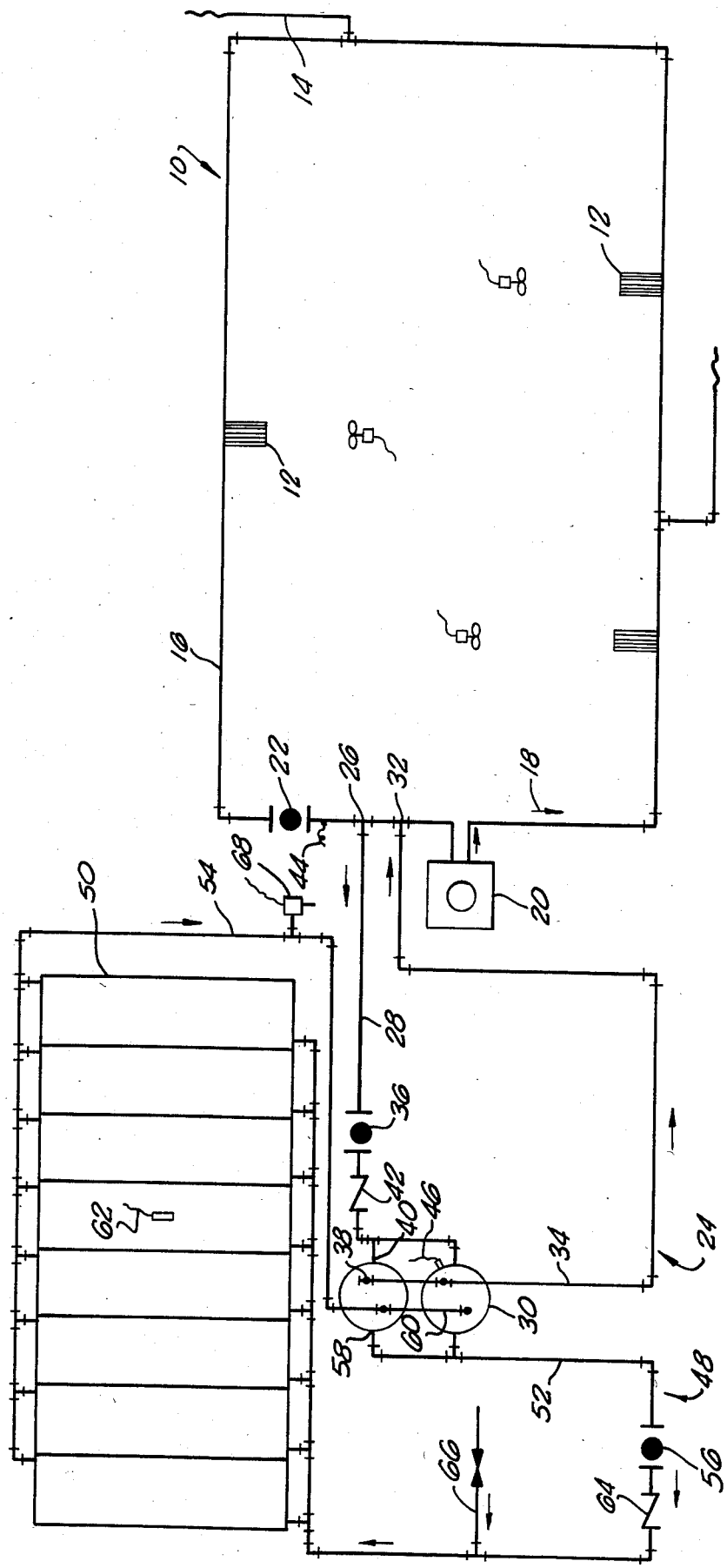
FIG. 1 is a schematic view of the system of the present invention.

Turning in detail to the drawings, a hot water supply system is disclosed as including a continuous hydraulic loop, generally designated 10. This representative continuous hydraulic loop 10 is illustrated as including heat exchangers 12 which are employed for space heating. Such space heating may be accomplished in accordance with the systems disclosed in U.S. Pat. Nos. 3,526,361 and 3,655,127, the disclosures of which are incorporated herein by reference. The continuous hydraulic loop 10 includes representative hot water lateral lines 14, also in accordance with the referenced U.S. patents. These lines 14 may lead to potable water fixtures in a home or building. Connecting the foregoing components is a loop conduit 16 through which water may flow as indicated by arrow 18.

The continuous hydraulic loop 10 may take on any appropriate configuration depending on the structure in which it is employed. Furthermore, multiple structures may be incorporated into a single system including buildings, homes, trailers, apartments or other structures requiring heat or hot water or both. The types of fixtures, coils and other devices may be varied as needed. Such a system may be employed solely for space heating, solely for hot water supply, for a combination of the two or any other appropriate purpose requiring a source of heated water.

Also positioned within the continuous hydraulic loop 10 is a boiler 20. The boiler 20 is intended to heat water within the loop. The boiler 20 is controlled by a modulating thermostat which monitors the incoming water from the loop and starts, modulates, and shuts off the boiler accordingly. The thermostat of the boiler 20 may be set at any appropriate temperature, hot water for housing normally being in a range about 130° F.

Also contained within the continuous hydraulic loop 10 is a first pump 22. This first pump 22, or loop pump, operates continuously to slowly move water about the loop. The speed with which the loop pump 22 circulates water through the continuous hydraulic loop 10 is determined by the needs of the system. The system is preferably designed such that the last fixture or coil before the boiler 20 receives adequately-heated water. This must take into account the use of heat from the water at upstream positions.

Coupled with the continuous hydraulic loop 10 is a storage circuit generally designated 24. The storage circuit 24 includes an inlet 26 in communication with the continuous hydraulic loop 10. An inlet storage conduit 28 extends between the inlet 26 and one or more storage tanks 30. Extending from the storage tank or tanks 30 to an outlet 32 in communication with the continuous hydraulic loop 10 is an outlet storage conduit 34. A second pump 36, or storage pump, is employed to drive water through the storage circuit 24. The passage of water through the storage circuit 24 should not be so great as to create direct flow from the outlet 32 to the inlet 26 through the main loop. Rather, the pump 36 should drive sufficient water through the storage circuit 24 to slow considerably the loop flow in the loop conduit 16 between the inlet 26 and outlet 32 in order that full benefit of the heated water in the storage circuit 24 may be realized.

The locations of the inlet 26 of the storage circuit 24 result in the removal of the coolest water from the continuous hydraulic loop 10, i.e., just before the boiler. The location of the outlet 32 of the storage circuit 24 results in the introduction of hot stored water to remove the burden of the boiler 20, i.e., between the inlet 26 and the boiler 20. In other terms, the storage circuit 24 is coupled with the continuous hydraulic loop 10 downstream of the last fixture of other device and upstream of the boiler.

The storage tank or tanks 30 are plumbed for the most efficient extraction of heat into the storage circuit 24. As the tank 30 will experience a natural thermal gradient of several degrees, the outlet storage conduit 34 draws water from the hottest point 38 in the tank, the very top. In this way, the hottest stored water is made available to the loop and, if hot enough, will fully take the place of the boiler 20. Water drawn from the loop 10 will normally be almost as hot as the warmest water in the tank 30. Consequently, the inlet 40 to the storage tank 30 from the inlet storage conduit 28 is located near the top of the tank. Naturally, the spacing will differ with the size of the tank.

Figure 2:
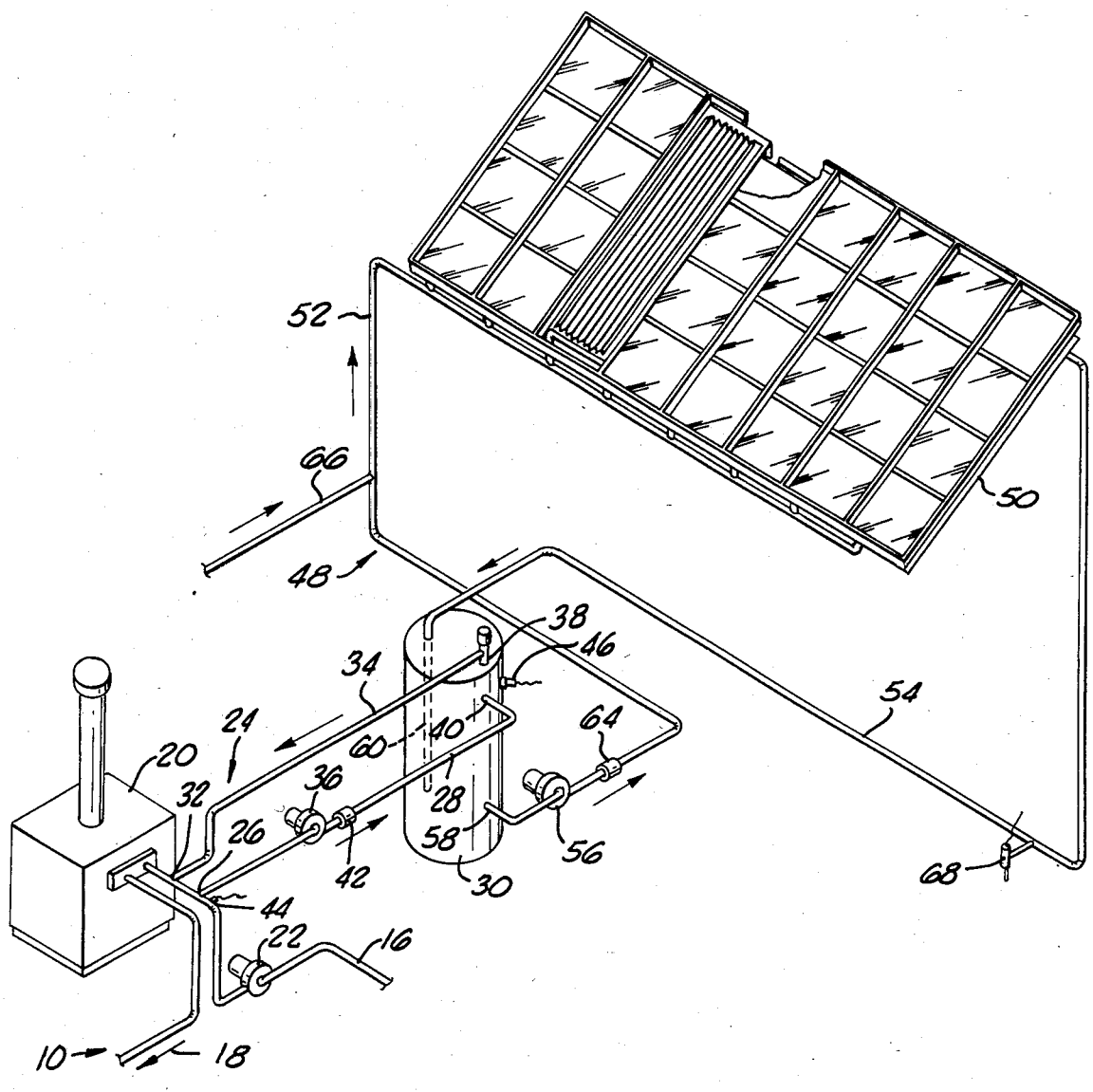
FIG. 2 is a more pictorial schematic perspective of a portion of the present invention.

FIG. 2 shows a single tank 30. However, FIG. 1 illustrates that two or more tanks may be used. The tanks are simply placed in parallel in the system with the same conduit lengths. In this way, both tanks will be used equally to supply the hot water. To prevent unwanted flow into the tanks 30 caused by differential pressures in the continuous loop or thermal cycling, a spring loaded check valve 42 is positioned somewhere in the storage circuit 24. The spring loaded nature of the check valve requires that the pump overcome a small pressure to open the valve. In this way, the valve 42 will not be left open or allowed to open under low differential pressure conditions.

Employment of the storage circuit 24 is not on a continuous basis as is the continuous hydraulic loop 10. Rather, the storage pump 36 is controlled by a differential termperature-sensing thermostat. The temperature of the loop water is monitored by a first sensor 44. This sensor 44 is upstream of the inlet 26 to the storage circuit 24 to monitor the water in the coolest portion of the continuous loop 10 prior to its being heated by either the storage circuit 24 or the boiler 20. A second sensor 46 is located near the top of one of the tanks 30. This sensor 46 is intended to monitor the temperature of the water which would be first withdrawn from the storage tank 30 for introduction to the continuous loop 10. The location of the sensor 46 near rather than at the top of the tank 30 is designed to insure against a situation when a small amount of air might be entrapped within the tank.

In the preferred embodiment, the differential thermostat is set so that the pump 36 will be energized when the sensor 46 is 3° Fahrenheit above the sensor 44. To insure against control problems and rapid cycling, the differential thermostat shuts the pump 36 off at a lower temperature differential. In the preferred embodiment, the pump 36 will shut off when the sensor 46 is 0.3° Fahrenheit above the sensor 44.

Through the foregoing control, stored hot water is introduced to the continuous loop 10 upstream of the boiler 20 when the stored water is hotter than the returning water in the continuous loop. In this situation, the storage circuit 24 is both helping the boiler 20 to maintain the temperature of the water in the loop and to provide heated feed water when needed. Whether the boiler 20 is to be activated will be determined by the temperature of the water exiting from the outlet 32 and passing directly in the continuous loop 10 past the inlet 26. In any event, the boiler will not have to work as hard to maintain the loop temperature even if there is insufficient heat in the storage circuit 24 to fully supply the needs of the continuous hydraulic loop 10.

Turning then to the last and final loop, a water heating system is employed which is contemplated as including a recurring transient heat source, i.e., a heat source which is not always available on demand. Solar energy is the most likely source of this heat and is included in the preferred embodiment. The water heating system, generally designated 48, includes a solar heat collector 50, a supply conduit 52 extending between the storage tanks 30 and the solar heat collector 50, and a return conduit 54 extending between the solar heat collector 50 and the storage tanks 30. Also included is a third pump, or heat source pump 56.

The water heating system is coupled with the storage tank or tanks 30 at locations near the bottom of the storage tank so as not to interfere with the hot water accumulated near the top of the tank. To this end, the outlet 58 from the tank to the supply conduit 52 is located near the bottom of the tank. The inlet from the return conduit 54 is in the form of a dip tube 60 which extends approximately two-thirds of the way down the tank. The dip tube is not located in a lower position because of the tendency of such tubes to stir sediment and create adverse currents.

Like the storage pump 36, the heat source pump 56 operates only under certain conditions. A control means in the form of a differential thermostat controls the pump 56 such that it is activated only when the solar panels are hotter than the water contained within the storage tank 30. To this end, a comparison is made between sensor 46 located on the storage tank 30 and a sensor 62 located on the back side of the solar panels 50. When the solar panels 50 are 3° Fahrenheit hotter than the upper portion of the storage tank 30, the heat source pump 56 is activated. When the differential drops to 0.3° Fahrenheit, the pump is deactivated. Thus, the solar panels 50 only circulate water to the storage tank 30 when the solar panels can contribute rather than detract from the heat energy contained within the tank.

The arrangement of the circuits and the components may be dictated by space, convenience and/or thermal efficiency. One such specific arrangement of the various components is disclosed in Piper U.S. Pat. application Ser. No. 289,401, now U.S. Pat. No. 4,576,333 filed concurrently herewith; the disclosure of which is incorporated herein by reference. This disclosed system employs an arrangement of the equipment to enhance system thermal efficiency.

To prevent thermal cycling which can occur when the solar panels are cool, a check valve 64 is employed. As such thermal cycling creates a very low pressure, a check valve may not close in resistence to that flow. Consequently, the check valve 64 is spring loaded to require a positive pressure from the pump 56 to initiate flow.

Between the check valve 64 and the solar panels 50 in the supply conduit 52, a feed water makeup inlet 66 supplies water to the system as needed. Because of the location of the cold water makeup inlet, this water must pass through the solar panels to reach the continuous hydraulic loop 10. The requirement that the incoming feed water pass through the solar panels 50, through the storage tank or tanks 30 and into the continuous loop 10 creates certain advantages. The passage of the incoming water through the solar panels 50 helps prevent freezing of the storage panel 50 under cold conditions. The water supplied from a utility is normally at least several degrees above freezing. Therefore, a small amount of heat in the feed water will keep the panels from freezing. Furthermore, thermostat 62 will activate pump 56 so that the system can control water flow through the panels producing 40° or below temperatures in the panels under very extreme conditions.

Passing the feed water through the panels also provides marginal heating during most periods of water use. During some periods of the day, the water heating system 48 will not be energized because the panels are not warm enough. However, the panels are warm enough to generate some heating of the feed water. Thus, some preheating of the water entering the storage tank or tanks 30 will be accomplished and is preferred over a direct feed of the colder makeup water.

The location of the inlet 66 also insures that the water actually delivered to the continuous hydraulic loop 10 is the hottest water stored in the tanks 30. As feed water progresses into the panels 50 and then into the storage tank 30, the hot water at the top of the storage tank is being delivered to the continuous hydraulic loop 10.

As a final advantage to the location to the feed water inlet 66, a solenoid valve 68 is coupled to the return conduit 54. This solenoid valve 68 is spring loaded biased to the open position and is retained closed by the same power directed to the pumps. During periods of power failure which often occur during cold storms, the solenoid opens and allows a flow of water through the solar panels 50 from the feed water inlet 66 to drain. Thus, the feed water again acts to keep the panels 50 from freezing.

Thus, an improved hot water supply system has been disclosed. While the embodiments and applications of this invention have been shown and described, it would be more apparent to those skilled in the art that many more modifications are possible without department from the inventive concepts herein described. The invention, therefore, is not to be restricted except by the spirit of the appended claims.

What is claimed is:

1. A hot water supply system, comprising
   a continuous hydraulic loop, including a loop conduit, a first pump positioned and arranged to circulate water in said loop conduit and a boiler positioned and arranged to heat water in said loop;
   a storage circuit including a storage tank, an inlet in communication with said loop, an inlet storage conduit extending from said inlet to said storage tank, an outlet in communication with said loop downstream from said inlet, an outlet storage conduit extending from said storage tank to said outlet, and a second pump positioned and arranged to circulate water through said storage circuit, said inlet and said outlet being upstream of said boiler;
   a water-heating system for heating water for said storage tank independent of said circuit; and
   first control means for activating said second pump only when the water in said storage tank is hotter than in said loop conduit upstream of said inlet.

2. The hot water supply system of claim 1 wherein said first control means includes a first sensor in said loop upstream of said inlet and a second sensor in said storage tank.

3. The hot water supply system of claim 2 wherein said second sensor is located near the top of said storage tank.

4. A hot water supply system, comprising a continuous hydraulic loop including a loop conduit, a first pump positioned and arranged to circulate water in said loop conduit and a boiler positioned and arranged to heat water in said loop;
   a storage circuit including a storage tank, an inlet in communication with said loop, an inlet storage conduit extending from said inlet to said storage tank, an outlet in communication with said loop downstream of said inlet, and outlet storage conduit extending from said storage tank to said outlet, and a second pump positioned and arranged to circulate water through said storage circuit, said inlet and said outlet being upstream of said boiler;
   a water-heating circuit including a solar heat collector, a supply conduit extending to said collector from said storage tank, a return circuit extending to said storage tank from said collector, and a third pump;
   first control means for activating said second pump only when the water in said storage tank is hotter than in said loop conduit upstream of said inlet; and
   a second control means for activating said third pump only when the solar heat collector is hotter than the water in said storage tank.

5. The hot water supply system of claim 4 further including a cold water makeup inlet upstream of said solar heat collectors.

6. The hot water supply system of claim 4 wherein said supply conduit and said return conduit of said water heating circuit are in communication with said storage tank near the bottom thereof.

7. The hot water supply system of claim 6 wherein said inlet storage conduit is in communication with said storage tank near the top thereof and said outlet storage conduit is in communication with said storage tank at the top of said storage tank.

8. The hot water supply system of claim 4 wherein one of said supply conduit and said return conduit includes a spring loaded check valve requiring positive pressure across said valve to open.

9. The hot water supply system of claim 4 wherein said first control means deactivates said second pump when the water in said storage tank is slightly hotter than in said loop conduit upstream of said inlet.

10. The hot water supply system of claim 4 wherein said second control means deactivates said third pump when the solar heat collector is slightly hotter than the water in said storage tank.

11. The hot water supply system of claim 4 further including a solenoid valve in communication with said return conduit, said solenoid valve being spring biased toward the open position and solenoid biased towards the closed position, said solenoid valve being coupled to drain.

12. The hot water supply system of claim 4 further including additional storage tanks arranged hydraulically parallel to said storage tank.

* * * * *